Oct. 3, 1961     C. H. MILLER     3,002,279

CALIBRATING MECHANISM

Filed July 2, 1957     3 Sheets-Sheet 1

INVENTOR.
Clarence H. Miller
BY
Harness, Dickey & Pierce
ATTORNEYS.

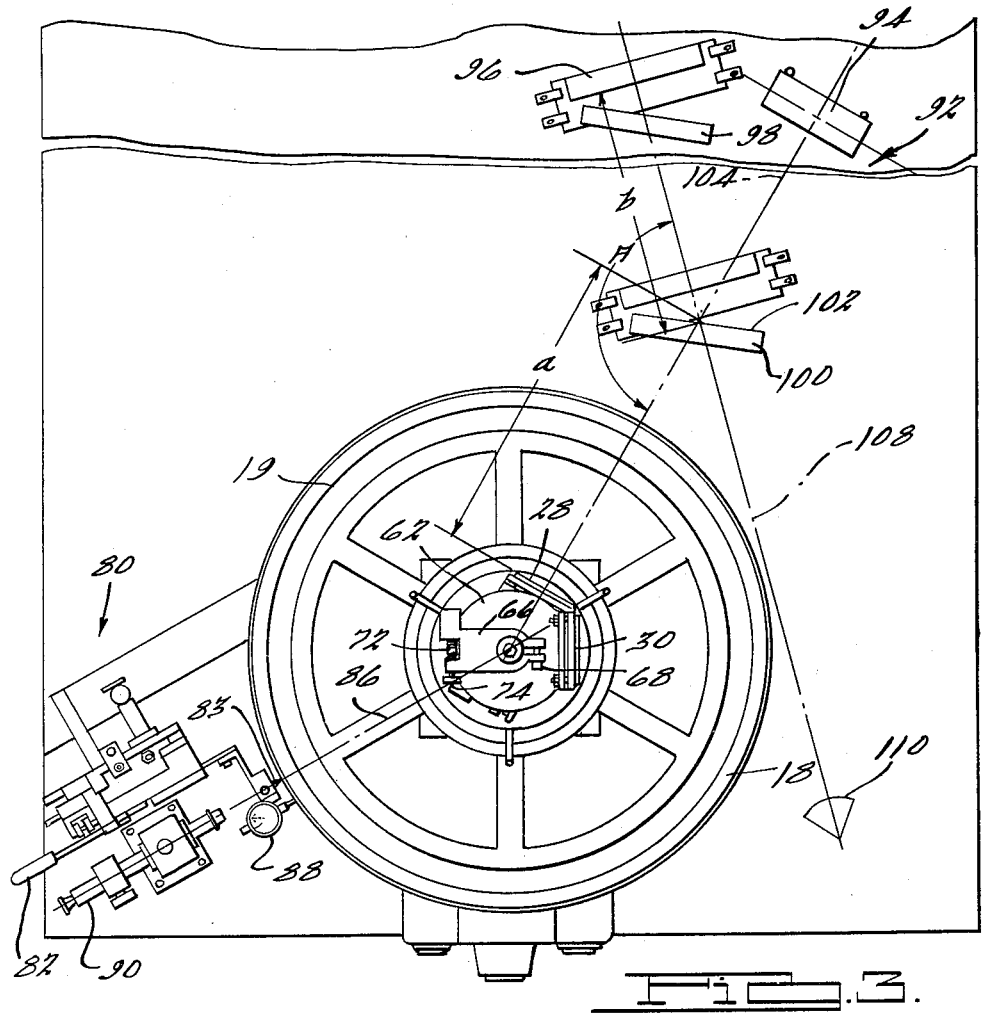
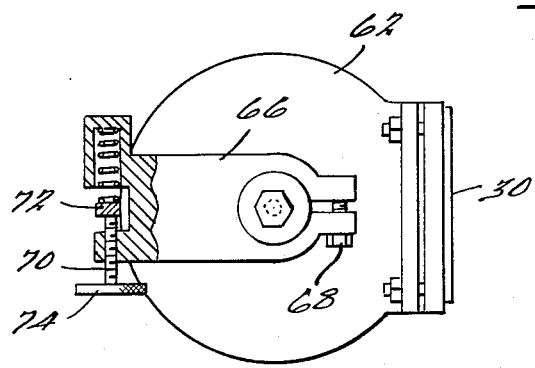
Fig. 3.
Fig. 4.
INVENTOR.
Clarence H. Miller
BY
Harness, Dickey & Pierce
ATTORNEYS.

Oct. 3, 1961  C. H. MILLER  3,002,279
CALIBRATING MECHANISM
Filed July 2, 1957  3 Sheets-Sheet 3
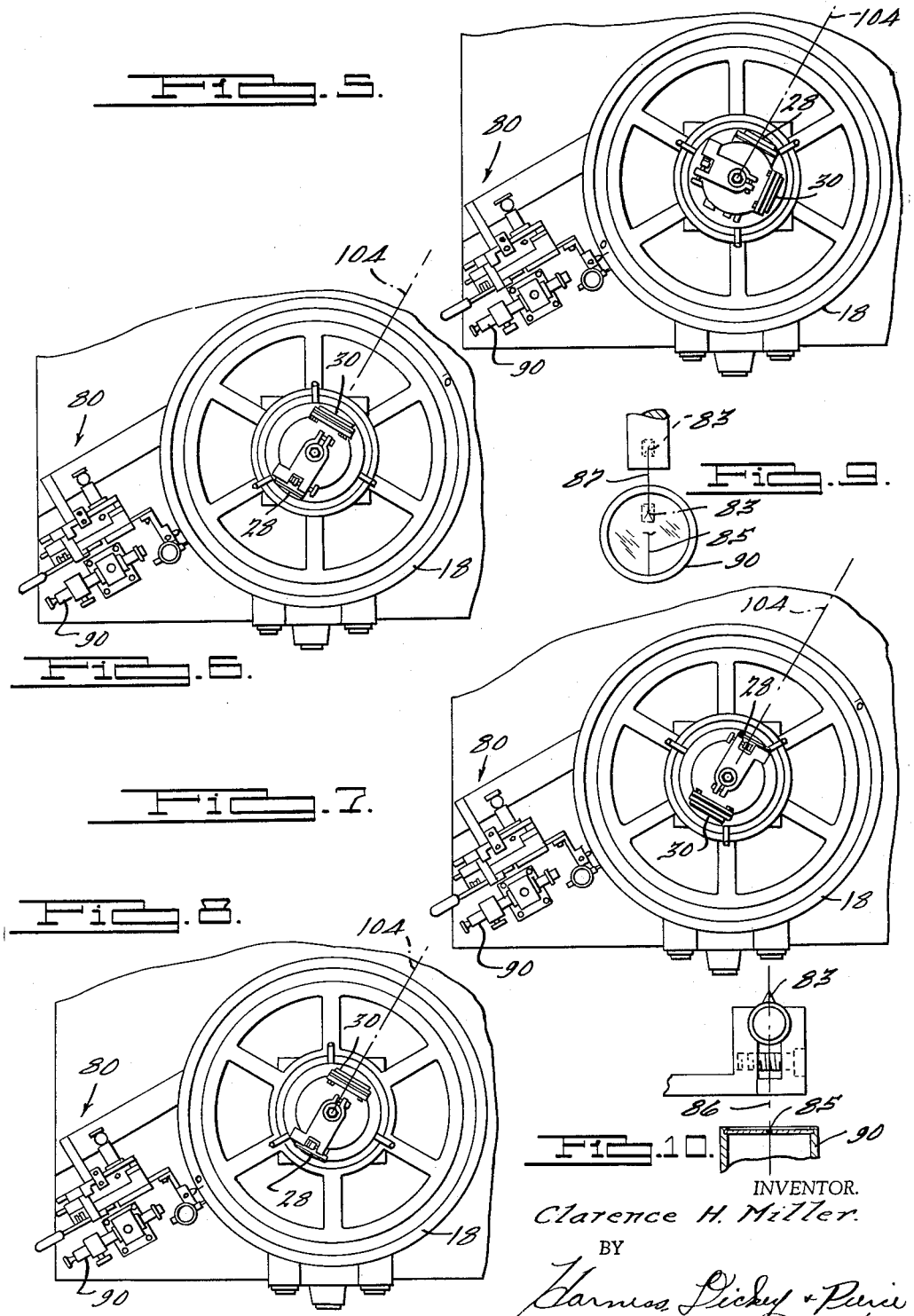
INVENTOR.
Clarence H. Miller
BY
Harness, Dickey & Pierce
ATTORNEYS.

United States Patent Office 3,002,279
Patented Oct. 3, 1961

3,002,279
CALIBRATING MECHANISM
Clarence Henry Miller, 1014 Balfour Road,
Grosse Pointe, Mich.
Filed July 2, 1957, Ser. No. 669,588
7 Claims. (Cl. 33—19)

This invention relates generally to calibrating apparatus and more particularly to a method and apparatus for calibrating with extreme accuracy.

Some machines require fine angular adjustments which have heretofore been impossible to achieve for the reason that the measuring apparatus associated with such machines has not been capable of measuring to the required accuracy. Any machine tool angular dividing device with which a skilled mechanic can orient a job (such as a piece of work on a precision rotary table) with an accuracy within two to five seconds of arc is usually considered a precision mechanism. The calibration equipment available for calibrating the measuring apparatus associated with these machines is in most cases incapable of providing calibrations which are accurate to an extent necessary for more precise machine adjustments.

It is an object of this invention, therefore, to provide an improved method and apparatus for calibrating angular measuring devices with extreme accuracy.

A further object of this invention is to provide a method and apparatus of the above type which utilizes light beams for dividing angular distances into equal subdivisions.

Another object of this invention is to provide an angle comparator for use in calibrating ring-shaped measuring members.

Another object of this invention is to provide a method and apparatus of the above type in which an interferometer is employed for continually subdividing angular distances until the desired number of subdivisions have been formed.

A further object of this invention is to provide a method and apparatus of the above described type which is relatively simple to assemble, and is reliable in operation in calibrating a ring-shaped member to an accuracy within one second of arc or less.

Further objects, features and advantages of this invention will become apparent from a consideration of the following description, the appended claims and the accompanying drawing in which:

FIG. 3 is a top plan view of the assembly illustrated in FIG. 1;

FIG. 4 is a sectional view looking substantially along the line 4—4 in FIG. 2;

FIGS. 5–8 are diagrammatic views illustrating the successive calibrating steps in the method of this invention;

FIG. 9 is a diagrammatic view through the microscope illustrating the relation of the microscope hairline and an initially formed calibration line; and FIG. 10 is a diagrammatic top view of the structure shown in FIG. 9.

Figure 1:
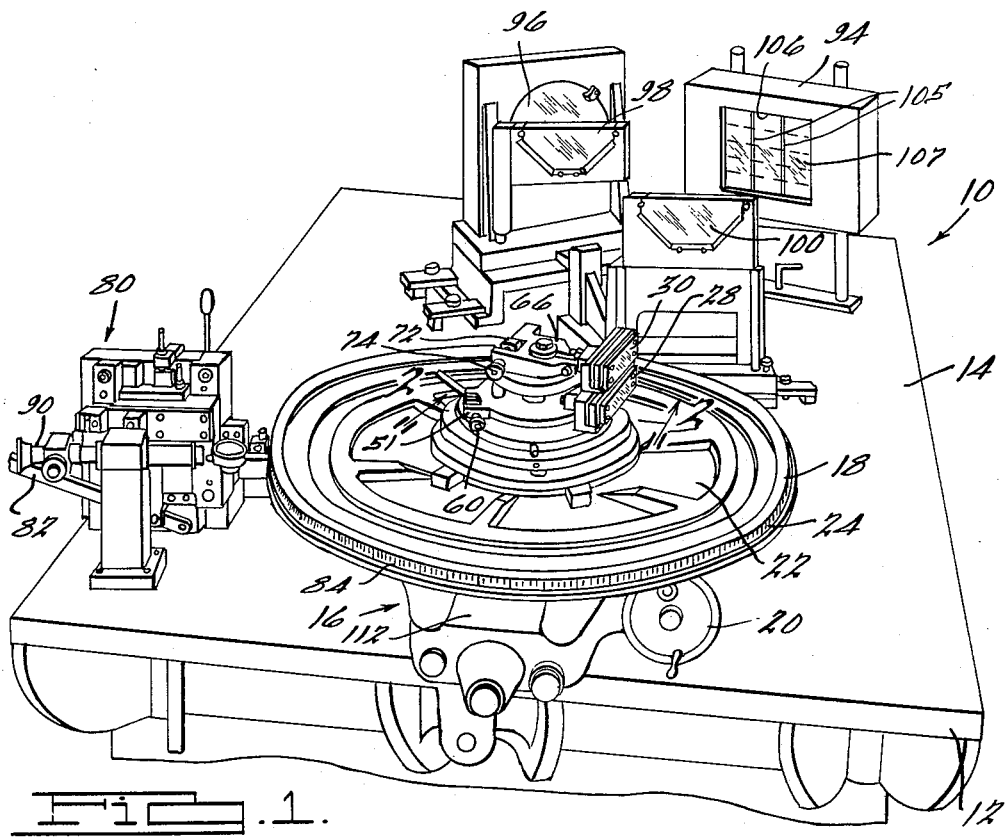
FIG. 1 is a perspective view of the calibrating apparatus of this invention, shown in assembly relation with a ring to be calibrated.

With reference to the drawing, the calibrating apparatus of this invention, indicated generally at 10, is illustrated in FIG. 1 mounted on a heavy supporting base 12 having a level top surface 14. Since the apparatus 10 is extremely sensitive, it is essential that the base 12 be firmly mounted in a stationary position.

A rotatable table unit 16 is mounted at one end of the base 12 for supporting a ring 18 to be calibrated. The unit 16 includes an actuating wheel 20 for rotating a table top member 22 to in turn rotate the ring 18, which is releasably secured in any suitable manner to the top member 22 such that the outer ring surface 24, which is the surface to be calibrated, is accessible. Suitable light clamps, cold solder or the like may be satisfactorily used to insure the retention of the ring 18 in a fixed position on the top member 22.

Mounted centrally of the table top 22 is a supporting unit 26 for a pair of flat upright mirrors 28 and 30. The supporting unit 26 includes a bottom member 32 secured by bolts 34 to the table top 32. A leveling plate 36 is adjustably mounted by means of leveling screws 38 on the bottom member 32. A wheel member 40, located directly above the leveling plate 36, has outwardly directed spokes or handles 42 to facilitate manual rotation of the wheel 40 for a purpose to appear later. The wheel 40 has an upwardly extending shaft 44 provided with a lower extension 46 supported in a bearing 48 carried by the leveling plate 36.

The ring 18 is mounted so that the inner surface thereof is concentric with a central hub 19 on the table top 22. In other words, in mounting the ring 18, the inner rather than the outer surface thereof is carefully centered relative to the axis of the table top 22. This may be done in any suitable manner but is easily accomplished by making the inner ring diameter of a size to loosely fit on the hub 19. With the ring 18 restrained against rotation, the hub 19 is rotated with the ring 18 within a gauge positioned against the outer ring surface 24. The gauge may be of any type which will indicate a movement of the ring 18 in a direction radially outwardly thereof. The ring position is then shifted until a complete turn of the hub 19 has no effect on the gauge reading indicating that the position of the ring has not been changed by a rotation of the hub 19. The table unit 16 must have the top 22 mounted so that there is no "run out" in the bearing supports therefor, namely, so that the top member 22 will rotate with no wobble.

Resting on an upwardly extending annular rim 50 on the wheel 40 is a supporting disk 52 for the lower mirror 28. The disk 52 carries an upwardly directed hollow shaft 54 arranged in a concentric relation about the shaft 44. A yoke 51 on the disk 52 carries a conventional threaded adjusting pin 56 extending through an upper projection 58 on the wheel 40, the arrangement being such that a knurled knob 60 on the pin 56 is rotatable to provide a fine adjustment of the angular position of the disk 52 relative to the wheel 40.

A supporting disk 62 for the upper mirror 30 is positioned about the hollow shaft 54 and supported on a series of upwardly extending pillars 64 formed on the disk 52. An arm 66 arranged above the disk 62 is releasably clamped to the hollow shaft 54 by a bolt 68. At the opposite end of arm 66 there is provided a threaded adjusting pin 70 (FIG. 4) like the pin 56, abutting an upward projection 72 on the disk 62. A conventional compression spring is provided between abutment 72 and an opposed portion of the end of arm 66 to hold the abutment against pin 70. A knurled operating knob 74 for the pin 70 is rotatable to provide for a fine adjustment of the angular position of the disk 62 relative to the shaft 54. By loosening the clamping bolt 68, the disk 62 and the arm 66 are freely rotatable as a unit about the shaft 54.

It is seen, therefore, that the mirror supporting unit 26 provides for an assembly of the mirrors 28 and 30 such that both mirrors can be rotated together about the central shaft 44 on rotation of the wheel 40 when the clamping bolt 68 is tightened. When the bolt 68 is loosened, the upper mirror 30 and its supporting disk 62 are separately rotatable relative to the lower mirror 28. Both mirrors are subject to fine angular adjustment by manipulation of their respective adjusting pins 56 and 70. As will more clearly appear hereinafter, the mirrors 28 and 30 when so adjusted are usable like a pair of precision dividers to subdivide angular distances.

An engraving unit 80 (FIGS. 1 and 3) having an operating handle 82 and a wedge-shaped diamond engraving or cutting tip 83 is positioned to one side of the table unit 16 for forming vertical calibration lines or cuts on the ring 18. The ring 18 is initially provided on the outer surface 24 thereof with calibration lines 84, illustrated as being one degree apart, by other apparatus which locates the lines 84 with reasonable accuracy. The apparatus 10 of this invention then utilizes the engraving tip 83 to subsequently form other calibration lines, corresponding to lines 84, which are invisible to the naked eye and which are accurately located to within a fraction of a second error. These lines, as will appear later, must be viewed through a microscope and in one embodiment of the invention are approximately .00015 inch wide and the same distance deep.

The tip 83 is movable toward and away from the ring 18 in a plane 86 extended radially of the ring 18. A conventional dial indicator measuring device 88 carried by the engraving unit 80 is positioned to one side of the tip 83 for insuring a uniform penetration of the ring surface 24 by the tip 83 during marking. As a result, a uniform width of the lines formed on the ring 18 by the tip 83 is obtained. A microscope 90, also located in the plane 86, and having a hairline 85 (FIGS. 9 and 10) is provided for viewing the lines formed by the tip 83 which, as pointed out above, are not visible to the naked eye. The tip 83 moves to a position above the line of sight of the microscope 90 at the completion of a marking operation so as not to interfere with the viewing of the calibration lines. As clearly appears in FIGS. 9 and 10, the microscope 90 is adjusted so that the hairline 85 is aligned with the tip 83. As a result, a calibration line, indicated at 87 in FIG. 9, is aligned with the hairline 85 when the line 87 is formed, with the tip 83 moving down into the line of sight of the microscope 90 and then up to a position above the line of sight.

By virtue of the location of the tip 83 and the mounting thereof for in and out movement in the plane 86, any out of round irregularities of the ring 18 do not affect the accuracy of the position of the tip 83 when it engages the ring 18 to form a calibration line on the ring.

An interferometer, indicated generally by the numeral 92, utilizes the flat mirrors 28 and 30, and is also mounted on the base 12. The interferometer 92 includes a monochromatic light unit 94, which in one embodiment of the invention is a surgical lamp using a fifteen watt General Electric bulb and provided with a glass shield 107 having a pair of upright visible lines 105. A fiducial back mirror 96, positioned to one side of the light source 94 is provided with the usual compensator 98 for improving the images viewed on a mirror 100, angularly disposed relative to both the light source 94 and the back mirror 96, and having a half-silvered face 102. The face 102 is approximately parallel to the compensator 98 and is arranged at an angle relative to a line 104 perpendicular to the shield 107 and the aperture 106 therefor in the light source 94. The line 104 also represents the direction of the useful light emitted from the source 94. The face 102 bisects the angle A (FIG. 3) between the line 104 and a line 108 perpendicular to the back mirror 96.

Figure 2:
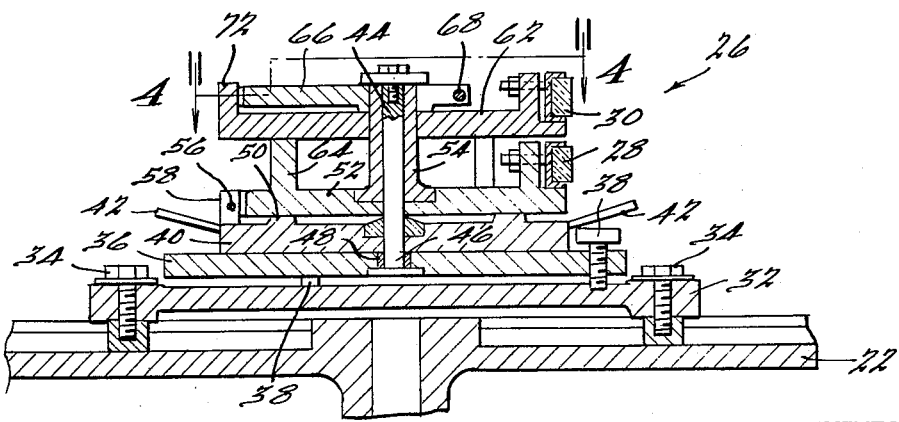
FIG. 2 is an enlarged transverse sectional view looking along the line 2—2 in FIG. 1.

As best appears in FIG. 2, the flat mirrors 28 and 30 are positioned equal distances from the shaft 44 so that they are movable to the vertically aligned position illustrated in FIG. 2. Accordingly, when either mirror 28 or 30 is moved to a position perpendicular to the line 104, it is spaced from a point on the mirror face 102 corresponding to the intersection of the lines 104 and 108 a distance indicated at "a" in FIG. 3. The distance indicated at "b," between the back mirror 96 and the same point on the face 102, may be either slightly greater or less than the distance a. In other words, it is essential that the distances a and b be different. In one embodiment of the invention, the distance a is thirty-two centimeters and the distance b is thirty-two centimeters and five milimeters with the angle A being one hundred thirty-five degrees.

With the interferometer 92 thus assembled, when a mirror 28 or 30 is exactly perpendicular to the line 104, and the mirror 100 is viewed from a position indicated at 110, and the viewer moves his eyes transversely of the line 108 so as to scan the width of the mirror 100 between the images of the vertical lines 105 on the shield 107, the fringe or ring pattern appearing on the mirror 100 remains constant. In the event the mirror 28 or 30 is slightly inclined or rotated relative to this perpendicular position, the fringe pattern on the mirror 100 changes during this transverse scanning of the mirror. This change may take the form of either expanding or contracting fringes, depending on whether the mirror 28 or 30 is disposed clockwise or counterclockwise relative to a perpendicular position. In other words, additional fringes form at the center of the fringe pattern and expand outwardly or the outer fringes contract inwardly and disappear at the center of the fringe pattern, depending on the position of the mirror 28 or 30 with respect to the line 104.

With a mirror 28 or 30 in either a perpendicular or rotated position and with the operator viewing the mirror 100, and rotatably adjusting the mirror 28 or 30, the fringes will likewise either expand or contract, depending upon the direction of adjustment of the mirror 28 or 30. In such case, the number of fringe expansions or contractions can be utilized as a measurement of the angular adjustment of the mirror. In addition, the mirror 28 or 30 is movable in the opposite direction until half this number of fringes has either expanded or contracted to thus bisect the original angular adjustment of the mirror 28 or 30.

In the use of the apparatus 10, assume that the ring 18 has been initially provided with the approximate calibrations lines 84, has been secured to the table top 22, and is to be provided with fine calibration lines accurate to within a fraction of a second of arc. The wheel 40 is rotated to a position in which the mirror 28 is exactly perpendicular to the line 104 (FIG. 5). This is accomplished as described above by moving the wheel 40 to a position in which the mirror 28 is approximately perpendicular to the line 104. It is apparent that the line 104 is an imaginary line so the operator actually observes the light source 94 and attempts to position the mirror 28 parallel to the shield 107. By subsequently operating the adjustment knob 60 for the mirror supporting disk 52 and observing the mirror 100, the operator locates the mirror 28 at a position in which the fringe pattern on the mirror 100 remains constant during transverse scanning of the mirror from the position indicated at 110.

With the ring 18 in this position, the engraving tip 83 is advanced along the plane 86 until the device 88 indicates the desired depth of engagement of the tip 83 with the ring surface 24. The unit 80 has an adjustable stop to insure this depth engagement of the tip 83 with the ring 18 during subsequent advancements of the tip 83. The handle 82 is operated to move the tip 83 downwardly to cut the ring 18 as shown in FIG. 9. This initial cut or line is formed as close as possible to the extended center of the visible zero calibration line 84 on the ring 18 at a position below the line 84.

The microscope 90 is adjusted so that the hairline 85 is set coincident with the initial calibration line 87 formed with the tip 83. This microscope setting is referred to as the initial master setting, with the mirror 28 at a setting for no fringe pattern change and the microscope hairline 85 set at true center with the initial engraved line. This setting is illustrated in FIGS. 9 and 10 with FIG. 9 showing the changed positions of the tip 83 during marking and showing only a portion of the hairline 85 so that it does not obscure the initial engraved line 87.

Once the mirror 28 has been thus located with respect to the interferometer 92 and the microscope 90, the operator manipulates the crank 20 to rotate the table top 22 about one hundred and eighty degrees. The table unit 16 has a viewing window 112 which the operator can observe to measure the approximate extent of rotation of the table top 22. The clamping bolt 68 for the arm 66 associated with the top mirror 30 is loosened and the mirror supporting disk 62 is rotated relative to the disk 52.

The disk 62 is moved to a position in which the mirror 30 is approximately perpendicular to the line 104, after which the clamping bolt 68 is again tightened and the fine adjustment knob 74 is operated to bring the mirror 30 to a position exactly perpendicular to the line 104 (FIG. 6). The wheel 40 is then turned to a position in which the bottom mirror 28 is again perpendicular to the line 104 (FIG. 7), after which the table top 22 is rotated another one hundred and eighty degrees to again position the mirror 30 perpendicular to the line 104 (FIG. 8) since, by virtue of the shaft support of the wheel 40 on the leveling plate 36, the table top 22 does not move during rotation of wheel 40. By utilizing the microscope 90, the location of the original zero mark is checked.

Assume that the zero line 87 is spaced slightly from the microscope hairline 85 with which the zero line was originally aligned. With the operator observing the mirror 100 from the position 110, the table top 22 is adjusted to bring the initial zero line back to a position aligned with the microscope hairline. While the table top 22 is being thus adjusted, the number of fringes that expand or contract in the image on the mirror 100 is recorded. By dividing this number of fringes in half, the operator can readily ascertain the number of fringes by which the angularity of the two mirrors 28 and 30 differs from exactly one hundred and eighty degrees. This difference is compensated by adjusting the top mirror 30 an angular distance corresponding to this half number of fringes. With the mirrors 28 and 30 thus positioned, the above process is repeated so that the spacing of the mirrors 28 and 30 is rechecked. Usually this mirror and table manipulation process is repeated about three times to insure a minimum error in the spacing of the mirrors. By rotating the table top 22 to a position in which the bottom mirror 28 is perpendicular to the line 104, and then manipulating the engraving unit 80 to form a second line on the ring 18, the operator is assured that this second marking line is one hundred and eighty degrees from the initial zero mark, within one second or less of arc error.

Each of the two one hundred and eighty degree subdivisions of the ring 18 is then subsequently subdivided by following the same procedure outlined above. In other words, each one hundred and eighty degree arc is subdivided into two ninety degree arcs, each of which is subsequently subdivided into three thirty degree arcs. Each thirty degree arc is then subdivided until the ring is provided with one degree calibrations. It is apparent that by this procedure, the ring 18 can be divided into any desired number and size of subdivisions.

In dividing any thirty degree arc, for example, the arc between the zero and thirty degree calibration lines, into three ten degree arcs, first locate the zero calibration mark at the microscope hairline. The bottom mirror 28 is then adjusted to a position perpendicular to the line 104 by using the interferometer 92 in the manner described above. By manipulating the crank 20, the table top 22 is rotated about ten degrees, following which the top mirror 30 is located perpendicular to the line 104 so that the mirrors 28 and 30 are angularly inclined about ten degrees. The table top 22 is rotated either clockwise or counterclockwise, depending on the direction of calibration, but for purposes of illustration, assume that the table top 22 has been rotated clockwise. The wheel 40 is manually rotated in the opposite direction, namely, counterclockwise, with the table top 22 remaining in a fixed position, until the bottom mirror 28 is perpendicular to the line 104. As previously described, when the table top member 22 is rotated the wheel 40 rotates with it since it is supported by the unit 26 on the member 22, but since the wheel 40 is rotatably supported on the plate 36, which is in turn secured to the top 22 by the member 32, when the wheel 40 is rotated by the handles 42, the top 22 remains stationary.

The table top 22 is rotated a second time in a clockwise direction until the mirror 30 is perpendicular to the line 104, following which the wheel 40 is again rotated in a reverse direction to locate the mirror 28 perpendicular to the line 104.

The table top 22 is then advanced a third time in a clockwise direction and the microscope 90 is utilized to check the location of the thirty degree calibration line relative to the microscope hairline. Assuming that there is some spacing of these lines, the crank 20 is used to align the calibration line with the hairline concurrently with the observation of the mirror 100 to count the fringes which either contract or expand as described above. This number of fringes is then divided by three to obtain the correct number of fringes by which the angular spacing of the mirrors 28 and 30 must be adjusted to obtain an exact ten degree spacing of the mirrors. Once this exact spacing has been accomplished, the ten degree and twenty degree lines are readily formed by locating the tip 83 and operating the handle 82 in the manner described above.

It is apparent that whatever error was involved in initially locating the one hundred and eighty degree calibration line is then continually reduced rather than multiplied during the forming of the subsequent calibration marks.

With the apparatus of this invention, the calibrations on the ring 18 are located with an accuracy such that there is less than one second error in each angular adjustment of the ring 18. The mirrors 28 and 30 are used like a pair of dividers to subdivide the ring into arc lengths of the desired size with the interferometer being operated to precisely position the mirrors 28 and 30. No actual measurements are required, only divisions of a three hundred and sixty degree circle. Accordingly, the ring 18 can be mounted on a precision instrument, such as a turntable associated with a jig-borer, to insure precision operation of the machine with an accuracy corresponding to the accuracy of the calibrations on the ring 18.

It is to be understood that the interferometer 92 is illustrated for accurately positioning the mirrors 28 and 30 because it is believed that more accuracy is obtained with the interferometer 92 than with other similar devices. However, any device operable to accurately position the mirrors 28 and 30 relative to the line 104 may be satisfactorily used. One such device is the well-known auto-collimator which also utilizes a light source and mirror reflectors.

Although the invention has been described with respect to a preferred embodiment thereof, it is to be understood that it is not to be so limited, since changes can be made therein which are within the scope of the invention as defined by the appended claims.

What is claimed is:

1. Apparatus for calibrating a circular member in angular increments comprising a pair of mirrors operatively associated with said circular member and arranged in an adjustable angular relationship, an interferometer operatively associated with said mirrors for checking the positions of said mirrors relative to said interferometer, a rotatable support member for said mirrors and said circular member for concurrently rotating the mirrors and the circular member, and means on said support member rotatably supporting the mirrors so that they are rotatable together as a unit independently of the support means and the circular member.

2. The method of calibrating in angular increments a circular member operatively associated with a pair of mirrors arranged in an adjustable angular relationship relative to one another and an interferometer for selectively positioning said mirrors in fixed predetermined positions relative to said interferometer, said method comprising the steps of mounting said circular member for rotation about an axis corresponding substantially to the axis of said circular member, mounting said mirrors for selective and concurrent rotation substantially about said axis, selectively manipulating said circular member and said mirrors relative to said interferometer and a marked portion of said circular member to arrange said mirrors in a predetermined angular relationship constituting a fraction of the angular portion of said circular member included in said marked portion, alternately rotating said circular member and said mirrors in one direction through an angle corresponding to the angular spacing of said mirrors and moving said mirrors as a unit in an opposite direction relative to said circular member through the same angle while maintaining said predetermined angular relationship, continuing said alternate rotation to rotate said circular member in said one direction a total angular distance corresponding substantially to said marked portion, and marking said circular member after each movement of said mirrors in increments corresponding to the included angle between said mirrors.

3. The method of calibrating in predetermined angular fractional increments a portion of a circular member mounted for rotation about the axis thereof and having a pair of mirrors mounted for rotation about said axis and arranged in an adjustable angular relationship relative to each other and operatively associated with a light source, said method comprising releasably fixing the angle between said mirrors, alternately rotating said circular member and said mirrors as a unit in one direction and said mirrors as a unit separately from said circular member in an opposite direction to determine the difference between said angle and the angle corresponding to said predetermined fractional increment, adjusting the angular relationship of said mirrors until said angles correspond, manipulating said mirrors relative to said ring to subdivide the ring into angular increments corresponding to the angle between said mirrors, and marking said ring in accordance with the positions of said mirrors.

4. The method of marking a predetermined number of equal subdivisions on a marked portion of a circular member operatively associated with a pair of mirrors arranged in an adjustable angular relationship relative to one another and an interferometer for indicating a predetermined position of each of said mirrors relative to said interferometer and for measuring an angular adjustment of a mirror, said method comprising the steps of mounting said circular member for rotation substantially about the axis thereof, mounting said mirrors for rotation as a unit substantially about said axis, selectively manipulating said circular member and said mirrors relative to said interferometer to arrange said mirrors in a predetermined angular relationship corresponding approximately to a subdivision, alternately rotating said circular member and said mirrors in one direction through an angle corresponding to the angular spacing of said mirrors and moving said mirrors as a unit in an opposite direction relative to said circular member through the same angle while maintaining said predetermined angular relationship, continuing said alternate rotation to rotate said circular member in said one direction a total angular distance corresponding substantially to said marked portion, utilizing said interferometer to determine the angular movement of one of said mirrors during rotation of said circular member through an angle corresponding to the difference between the angles represented by said marked portion and said distance, adjusting the angular relationship of said mirrors in accordance with the angular movement of said one mirror to insure an angular spacing of said mirrors corresponding to a subdivision, repeating the steps of alternately rotating said circular member in one direction through said marked portion and rotating said mirrors as a unit in an opposite direction, and marking said portion of the circular member in each rotated position of the circular member during said last alternate rotation thereof to indicate said subdivisions thereon.

5. Apparatus for calibrating a circular member in angular increments comprising a pair of mirrors operatively associated with said circular member and arranged in an adjustable angular relationship, an interferometer operatively associated with said mirrors for indicating a predetermined position for each of said mirrors, a rotatable wheel arranged in a supporting relationship with said mirrors, means supporting said mirrors for rotation relative to said wheel, said wheel being rotatable to move said mirrors relative to said circular member while maintaining the mirrors in a predetermined angular relationship, and marking means for forming calibration marks on said circular member at spaced positions corresponding to the angular spacing of said mirrors.

6. In a system for calibrating in angular increments a circular member mounted in a fixed position on a rotatable table, a pair of flat mirrors rotatably mounted on said table for independent rotatable movement, a rotatable wheel member arranged in a supporting relation with said pair of mirrors for concurrently rotating said mirrors and maintaining the angular spacing thereof, light and mirror means operatively associated with said flat mirrors for selectively indicating a predetermined position of each mirror, means for maintaining said mirrors in a predetermined angular relationship, and means movable radially inwardly and outwardly relative to said circular member for selectively engaging and forming calibration lines of uniform thickness on the circular member at spaced positions corresponding to the angular spacing of said mirrors.

7. In a system for calibrating in angular increments a circular member mounted in a fixed position on a rotatable table, a pair of flat mirrors rotatably mounted on said table for independent rotatable movement, a rotatable wheel member arranged in a supporting relation with said pair of mirrors for concurrently rotating said mirrors and maintaining the angular spacing thereof, light and mirror means operatively associated with said flat mirrors for selectively indicating a predetermined position of each mirror, means for maintaining said mirrors in a predetermined angular relationship, means movable radially inwardly and outwardly relative to said circular member for selectively engaging and forming calibration lines of uniform thickness on the circular member at spaced positions corresponding to the angular spacing of said mirrors, said lines being visible only when viewed through a microscope, and microscope means mounted adjacent said calibration line forming means for observing the lines formed thereby.

References Cited in the file of this patent

UNITED STATES PATENTS

| 2,437,807 | Dowell et al. | Mar. 16, 1948 |
| 2,584,393 | Lipp | Feb. 5, 1952 |

FOREIGN PATENTS

| 568,936 | Great Britain | Apr. 26, 1945 |